US010740153B2

(12) United States Patent
Choi et al.

(10) Patent No.: US 10,740,153 B2
(45) Date of Patent: Aug. 11, 2020

(54) GENERATING DUPLICATE APPARATUSES FOR MANAGING COMPUTING RESOURCES BASED ON NUMBER OF PROCESSING TASKS

(71) Applicant: SAMSUNG SDS CO., LTD., Seoul (KR)

(72) Inventors: Jung-Ho Choi, Seoul (KR); Young-Woo Kim, Seoul (KR); Kang-Gu Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 107 days.

(21) Appl. No.: 15/711,616

(22) Filed: Sep. 21, 2017

(65) Prior Publication Data
US 2018/0081728 A1   Mar. 22, 2018

(30) Foreign Application Priority Data
Sep. 21, 2016   (KR) ........................ 10-2016-0120484

(51) Int. Cl.
| G06F 9/50 | (2006.01) |
| G06F 9/48 | (2006.01) |
| H04L 29/08 | (2006.01) |
| G06F 9/455 | (2018.01) |
| G06Q 10/06 | (2012.01) |

(52) U.S. Cl.
CPC ............ G06F 9/505 (2013.01); G06F 9/4881 (2013.01); G06F 9/5083 (2013.01); *G06F 2009/4557* (2013.01); *G06F 2209/5022* (2013.01); *G06Q 10/06315* (2013.01); *H04L 67/32* (2013.01)

(58) Field of Classification Search
None
See application file for complete search history.

(56) References Cited

U.S. PATENT DOCUMENTS

| 4,858,120 | A | * | 8/1989 | Samuelson | G06Q 10/06 705/7.25 |
| 6,771,269 | B1 | * | 8/2004 | Radecki | G09G 5/363 345/503 |
| 7,389,303 | B2 | * | 6/2008 | Verma | G06F 16/10 |
| 8,296,434 | B1 | * | 10/2012 | Miller | H04L 67/1029 709/226 |
| 9,154,549 | B2 | * | 10/2015 | Sundararaj | G06F 9/505 |
| 9,430,256 | B2 | * | 8/2016 | Raghu | G06F 9/455 |
| 9,485,323 | B1 | * | 11/2016 | Stickle | H04L 67/32 |
| 9,705,704 | B2 | * | 7/2017 | So | H04L 12/4641 |
| 10,341,426 | B2 | * | 7/2019 | Guzman | H04L 67/101 |

(Continued)

*Primary Examiner* — Abu Zar Ghaffari
(74) *Attorney, Agent, or Firm* — Sughrue Mion, PLLC (57) ABSTRACT

An apparatus and a method for managing computing resources are disclosed. The apparatus for managing computing resources includes a task input interface configured to receive a plurality of processing-target tasks; a task processor configured to sequentially process the plurality of received processing-target tasks; and a duplicate device manager configured to generate one or more duplicate devices by duplicating the apparatus for managing computing resources based on at least one among a ratio of a number of unprocessed tasks to a number of processing-target tasks and the number of unprocessed tasks, and assign unprocessed tasks to the one or more generated duplicate devices.

17 Claims, 8 Drawing Sheets

(56) References Cited

U.S. PATENT DOCUMENTS

| | | | | |
|---|---|---|---|---|
| 2005/0246432 | A1* | 11/2005 | Iijima | H04N 7/17309 709/223 |
| 2007/0124731 | A1* | 5/2007 | Neiman | G06F 9/4843 718/100 |
| 2009/0077246 | A1* | 3/2009 | Lee | H04N 7/17336 709/229 |
| 2011/0126197 | A1* | 5/2011 | Larsen | H04L 9/3213 718/1 |
| 2011/0283292 | A1* | 11/2011 | Saffre | G06F 9/5088 718/104 |
| 2012/0102185 | A1* | 4/2012 | Fernandes | H04L 67/38 709/224 |
| 2012/0222041 | A1* | 8/2012 | Sabin | H04L 67/1008 718/105 |
| 2013/0145367 | A1* | 6/2013 | Moss | H04L 43/04 718/1 |
| 2015/0006716 | A1* | 1/2015 | Suchter | G06F 9/5038 709/224 |
| 2015/0120818 | A1* | 4/2015 | Kim | G06F 9/45558 709/203 |
| 2015/0134831 | A1* | 5/2015 | Hiroishi | H04L 67/1008 709/226 |
| 2015/0156135 | A1* | 6/2015 | Brandwine | G06F 9/45533 709/226 |
| 2015/0236974 | A1* | 8/2015 | Minamitake | H04L 47/726 709/226 |

* cited by examiner

GENERATING DUPLICATE APPARATUSES FOR MANAGING COMPUTING RESOURCES BASED ON NUMBER OF PROCESSING TASKS

CROSS-REFERENCE TO RELATED APPLICATION

This application claims priority to and the benefit of Korean Patent Application No. 2016-0120484, filed on Sep. 21, 2016, the disclosure of which is incorporated herein by reference in its entirety.

BACKGROUND

1. Field

The present disclosure relates to a technology for managing computing resources in a cloud environment.

2. Discussion of Related Art

With the proliferation of a cloud service, the number of cases of processing a massive task in parallel using a plurality of virtual machines is increasing recently. For example, in a massive distributed architecture such as a micro service architecture (MSA) and the like, it is necessary to rapidly distribute a new or updated application to a large number of servers. Accordingly, an administrator of a distributed architecture divides a target server which will distribute the application into a plurality of virtual machines and performs a distribution task.

However, in the technology for running virtual machines in parallel according to the related art, virtual machines whose number is arbitrarily determined to be appropriate by the administrator are generated, and thus there is a limitation in assigning optimal computing resources for the computation amount of a task to be performed. Also, in the technology for running virtual machines in parallel according to the related art, the administrator generates virtual machines one by one, and thus an increase in the number of virtual machines causes the additional load of running additional virtual machines.

SUMMARY

The present disclosure is directed to providing a means for dynamically assigning optimal computing resources for the number or the computation amount of tasks to be processed.

The present disclosure is also directed to minimizing the load of managing and administering computing resources required for processing a series of tasks.

According to an aspect of the present disclosure, there is provided an apparatus for managing computing resources, the apparatus comprising: a task input interface configured to receive a plurality of processing-target tasks; a task processor configured to sequentially process the plurality of received processing-target tasks; and a duplicate device manager configured to generate one or more duplicate devices by duplicating the apparatus for managing computing resources based on at least one among a ratio of a number of unprocessed tasks to a number of processing-target tasks and the number of unprocessed tasks, and assign unprocessed tasks to the one or more generated duplicate devices.

The duplicate device manager may be further configured to generate the one or more duplicate devices in response to the ratio of the number of unprocessed tasks to the number of processing-target tasks being a preset value or more.

The task input interface may be further configured to input the plurality of received processing-target tasks to a task queue, wherein the task processor sequentially may be further configured to sequentially process processing-target tasks stored in the task queue, and wherein the duplicate device manager may be further configured to calculate the ratio of the number of unprocessed tasks to the number of processing-target tasks in response to a usage rate of the task queue being within or exceeding a preset range.

The duplicate device manager may be further configured to determine a number of duplicate devices to be generated based on at least one among the number of unprocessed tasks and the ratio of the number of unprocessed tasks to the number of processing-target tasks.

The duplicate device manager may be further configured to equally assign the unprocessed tasks to two or more duplicate devices in response to the two or more duplicate devices being generated.

The one or more duplicate devices may be configured to process one or more tasks assigned by the apparatus for managing computing resources, generate one or more secondary duplicate devices corresponding to the one or more duplicate devices based on at least one among a ratio of a number of unprocessed secondary tasks to a number of assigned unprocessed tasks and the number of unprocessed secondary tasks, and assign unprocessed secondary tasks to the one or more secondary duplicate devices.

The duplicate device manager may be further configured to determine whether the unprocessed tasks assigned to the one or more duplicate devices have been completed and delete the one or more duplicate devices in response to determining the unprocessed tasks have been completed.

The unprocessed tasks may be from among the processing-target tasks, and wherein the number of unprocessed tasks may correspond to the unprocessed tasks.

According to another aspect of the present disclosure, there is provided a method of managing computing resources, the method being performed by a computing device including one or more processors and a memory storing one or more programs executed by the one or more processors and comprising: receiving a plurality of processing-target tasks; sequentially processing the plurality of received processing-target tasks; generating one or more duplicate devices by duplicating the computing device based on at least one among a ratio of a number of unprocessed tasks to a number of processing-target tasks and the number of unprocessed tasks; and assigning unprocessed tasks to the one or more generated duplicate devices.

The generating of the one or more duplicate devices may comprise generating the one or more duplicate devices in response to the ratio of the number of unprocessed tasks to the number of processing-target tasks being a preset value or more.

The receiving of the plurality of processing-target tasks may comprise inputting the plurality of received processing-target tasks to a task queue, wherein the sequentially processing of the plurality of received processing-target tasks may comprise sequentially processing the plurality of processing-target tasks, and wherein the generating of the one or more duplicate devices may comprise calculating the ratio of the number of unprocessed tasks to the number of processing-target tasks in response to a usage rate of the task queue being within or exceeding a preset range.

The generating of the one or more duplicate devices may comprise determining a number of duplicate devices to be generated based on at least one among the number of unprocessed tasks and the ratio of the number of unprocessed tasks to the number of processing-target tasks.

The assigning of the unprocessed tasks may comprise equally assigning the unprocessed tasks to two or more duplicate devices in response to the two or more duplicate devices being generated.

The method may further include by the one or more duplicate devices, processing one or more tasks assigned by the computing device, generating one or more secondary duplicate devices corresponding to the one or more duplicate devices based on at least one among one or more of a ratio of a number of unprocessed secondary tasks to a number of assigned unprocessed tasks and the number of unprocessed secondary tasks, and assigning unprocessed secondary tasks to the one or more secondary duplicate devices.

The method may further include, after the assigning of the unprocessed tasks: determining whether the unprocessed tasks assigned to the one or more duplicate devices have been completed; and deleting the one or more duplicate devices in response to determining the unprocessed tasks have been completed.

According to another aspect of the present disclosure, there is provided a non-transitory computer readable recording medium having embodied thereon a program, which when executed by a processor causes the processor to execute a method including: receiving a plurality of processing-target tasks; sequentially processing the plurality of received processing-target tasks; generating one or more duplicate devices by duplicating a computing device based on at least one among a ratio of a number of unprocessed tasks to a number of processing-target tasks and the number of unprocessed tasks; and assigning unprocessed tasks to the one or more generated duplicate devices.

The generating of the one or more duplicate devices may comprise generating the one or more duplicate devices in response to the ratio of the number of unprocessed tasks to the number of processing-target tasks being a preset value or more.

The receiving of the plurality of processing-target tasks may comprise inputting the plurality of received processing-target tasks to a task queue, wherein the sequentially processing of the plurality of received processing-target tasks may comprise sequentially processing the plurality of processing-target tasks, and wherein the generating of the one or more duplicate devices may comprise calculating the ratio of the number of unprocessed tasks to the number of processing-target tasks in response to a usage rate of the task queue being within or exceeding a preset range.

The generating of the one or more duplicate devices may comprise determining a number of duplicate devices to be generated based on at least one among the number of unprocessed tasks and the ratio of the number of unprocessed tasks to the number of processing-target tasks.

The assigning of the unprocessed tasks may comprise equally assigning the unprocessed tasks to two or more duplicate devices in response to the two or more duplicate devices being generated.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail with reference to the accompanying drawings. The following description is provided to help comprehensive understanding of a method, apparatus, and/or system disclosed herein. However, it is just exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be described below are defined in consideration of functionality in the present disclosure, which may vary according to an intention of a user or an operator or a usual practice. Therefore, definitions thereof should be made on the basis of the overall content of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," or "including," when used herein, specify the presence of stated features, numerals, steps, operations, elements, or combinations thereof, but do not preclude the presence or addition of one or more other features, numerals, steps, operations, elements, or combinations thereof.

Figure 1:
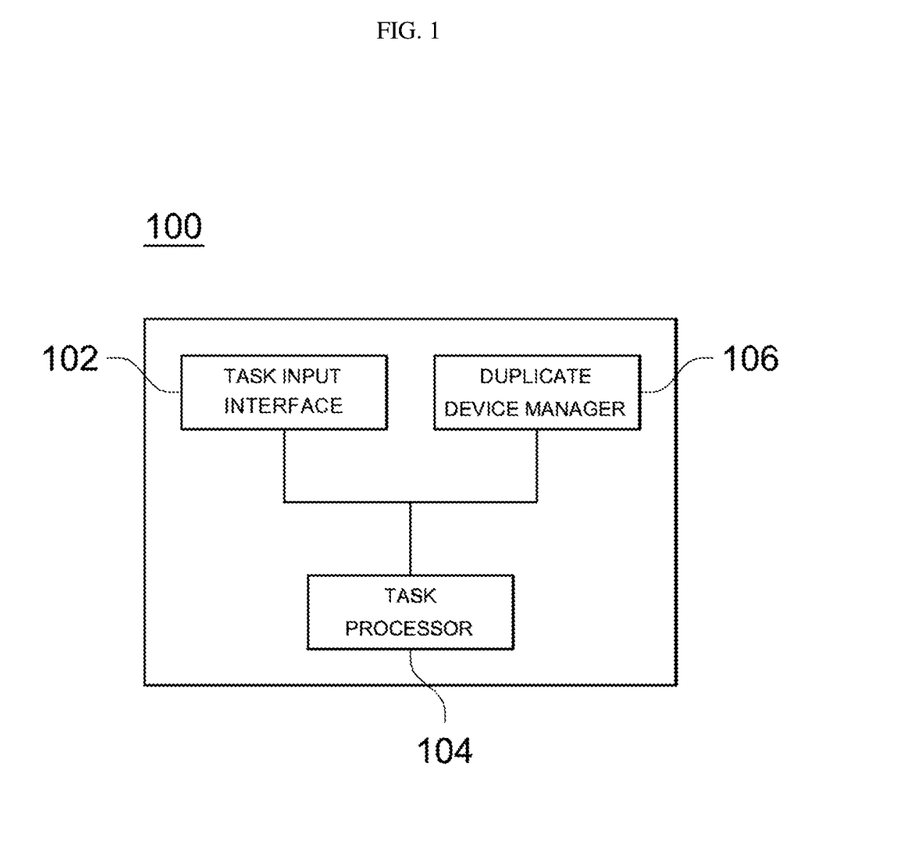
FIG. 1 is a block diagram illustrating an apparatus for managing computing resources according to an exemplary embodiment of the present disclosure.

FIG. 1 is a block diagram illustrating an apparatus 100 for managing computing resources according to an exemplary embodiment of the present disclosure. As shown in the drawing, the apparatus 100 for managing computing resources according to an exemplary embodiment of the present disclosure includes a task input interface 102, a task processor 104, and a duplicate device manager 106.

The task input interface 102 receives a plurality of processing-target tasks and sequentially inputs the processing-target tasks to a task queue (worker queue) of a memory. In an exemplary embodiment, the plurality of processing-target tasks may be tasks in which an application is installed or updated in a plurality of target servers. In this case, each of the processing-target tasks may include access information of an assigned target server, an application package to be installed in the target server, a script for installing or updating the application package, and the like. However, exemplary embodiments of the present disclosure are not limited to specific types of tasks and may be applied to any kind of series of tasks requiring computing resources.

The task processor 104 extracts the processing-target tasks stored in the task queue and sequentially processes the processing-target tasks. In an exemplary embodiment, the task input interface 102 may input each of the plurality of processing-target tasks into the task queue in the form of a thread (worker thread). In this case, the task processor 104 may process a plurality of threads stored in the task queue each time in consideration of performance of a central processing unit (CPU) and the like. For example, when the number of cores of a CPU included in the apparatus 100 for managing computing resources is two and the number of threads processable by the task processor 104 is set to be double the number of cores, the task processor 104 may simultaneously process eight of the processing-target tasks stored in the task queue each time. For example, when the plurality of processing-target tasks are tasks in which an application is installed or updated in a plurality of target servers like in the above-described exemplary embodiment, the task processor 104 may simultaneously access eight target servers using access information of the target servers included in each of the processing-target tasks and install or update an application package in the accessed target servers.

The duplicate device manager 106 generates one or more duplicate devices corresponding to the apparatus 100 for managing computing resources in consideration of one or more of a ratio of the number of unprocessed tasks to the number of processing-target tasks and the number of unprocessed tasks which are not input into the task queue among the processing-target tasks, and assigns the unprocessed tasks to the one or more generated duplicate devices.

In exemplary embodiments of the present disclosure, duplicate devices are virtual machines which are obtained by duplicating the apparatus 100 for managing computing resources and configured to perform the same function as the apparatus 100 for managing computing resources, and are generated and deleted by the duplicate device manager 106. The duplicate devices process tasks assigned by the duplicate device manager 106 among the plurality of processing-target tasks, and may generate one or more secondary duplicate devices as necessary and recursively reassign some of the tasks assigned thereto. Likewise, the secondary duplicate devices may generate one or more tertiary duplicate devices as necessary and then recursively reassign some of the tasks assigned thereto.

In this way, according to exemplary embodiments of the present disclosure, it is possible to assign optimal computing resources for the computation amount of processing-target tasks by dynamically generating one or more duplicate devices in stages according to the computation amount of processing-target tasks and distributing the processing-target tasks. Also, since each of the duplicate devices is managed by the apparatus 100 for managing computing resources or a duplicate device superior to the duplicate device, an administrator may manage only the single uppermost apparatus 100 for managing computing resources without managing all virtual machines. Therefore, according to exemplary embodiments of the present disclosure, it is possible to minimize the load of managing and administering computing resources required for processing a series of tasks.

The duplicate device manager 106 may generate and delete duplicate devices on the basis of the following setting values.

Max queue count: a maximum number (e.g., 1024) of task threads (worker threads) storable in a task queue Semaphore count: a maximum number (e.g., double the number of CPU cores) of threads simultaneously processable by the task processor 104

Unprocessed waiting time: a waiting time (e.g., 60 seconds) after a usage rate of the task queue is included in or exceeds the preset range Options of generating duplicate device: no duplication, serial duplication (only one duplicate device is generated at one time), parallel duplication (two or more duplicate devices are generated at one time), or automatic generation (the option of generating a duplicate device is dynamically changed according to the computation amount of unprocessed tasks)

Period of checking generation of duplicate device: a period of checking whether a duplicate device has been completely generated (e.g., 60 seconds)

Period of checking progress of task of duplicate device: a period of checking the progress of a task of a duplicate device duplicated by the duplicate device manager 106 (e.g., 60 seconds)

Reference value for determining generation of duplicate device: a reference value for determining whether to generate a duplicate device, the reference value being able to be set as a ratio or a number according to an exemplary embodiment A process in which the duplicate device manager 106 generates a duplicate device will be described in further detail now. When the usage rate of the task queue is within or exceeds a preset range (in other words, when the number of task threads input into the task queue is included in a range which is set with respect to the max queue count (e.g., 80% or above), the task input interface 102 stops generation of task threads and input of the task threads into the task queue. Also, the duplicate device manager 106 waits for the unprocessed waiting time from a point in time when the task queue is filled to a certain level or higher, and then calculates the number or a ratio of unprocessed tasks (tasks which have not been input into the task queue yet).

For example, the duplicate device manager 106 may determine that it is necessary to generate the one or more duplicate devices when the ratio of the number of unprocessed tasks to the number of processing-target tasks is a preset value (the reference value for determining generation of a duplicate device) or more. Alternatively, according to an exemplary embodiment, the duplicate device manager 106 may determine that it is necessary to generate the one or more duplicate devices when the number of unprocessed tasks is a preset value or more.

When it is determined that it is necessary to generate a duplicate device, the duplicate device manager 106 generates a duplicate device according to an option value for the aforementioned options of generating a duplicate device. For example, the duplicate device manager 106 generates one duplicate device when the option value is set to "serial duplication," and simultaneously generates two or more duplicate devices according to a specific setting value when the option value is set to "parallel duplication." Also, when the option value is set to "no duplication," the duplicate device manager 106 does not generate any duplicate device regardless of whether a duplicate device is necessary.

In an exemplary embodiment, the option value may be set to "automatic generation." In this case, the duplicate device manager 106 may select one option among "no duplication," "serial duplication," and "parallel duplication" according to the number or the ratio of unprocessed tasks corresponding to a determination point in time and generate a duplicate device accordingly. In other words, the duplicate device manager 106 determines the number of duplicate devices to be generated according to the number or the ratio of unprocessed tasks.

When a duplicate device is generated, the duplicate device manager 106 assigns the unprocessed tasks of the apparatus 100 for managing computing resources to the duplicate device. When two or more duplicate devices are generated, the duplicate device manager 106 may equally assign the unprocessed tasks to the two or more duplicate devices.

After the unprocessed tasks are assigned, the duplicate device manager 106 determines whether the unprocessed tasks assigned to the duplicate device have been completed. In an exemplary embodiment, the duplicate device manager 106 may determine whether an unprocessed task assigned to each duplicate device has been completed according to a preset period of checking the progress of a task of a duplicate device. Also, according to an exemplary embodiment, the duplicate device manager 106 may be configured to determine whether the unprocessed tasks assigned to the duplicate device have been completed after the tasks input into the task queue are completely processed. When it is determined that the unprocessed tasks assigned to the duplicate device have been completed, the duplicate device manager 106 deletes the duplicate device.

FIGS. 2 to 6 are example diagrams illustrating a process in which the apparatus 100 for managing computing resources generates and deletes duplicate devices according to an exemplary embodiment of the present disclosure. The example diagrams show exemplary embodiments in which the option of generating a duplicate device is set to "parallel duplication (two duplicate devices are generated)."

Figure 2:
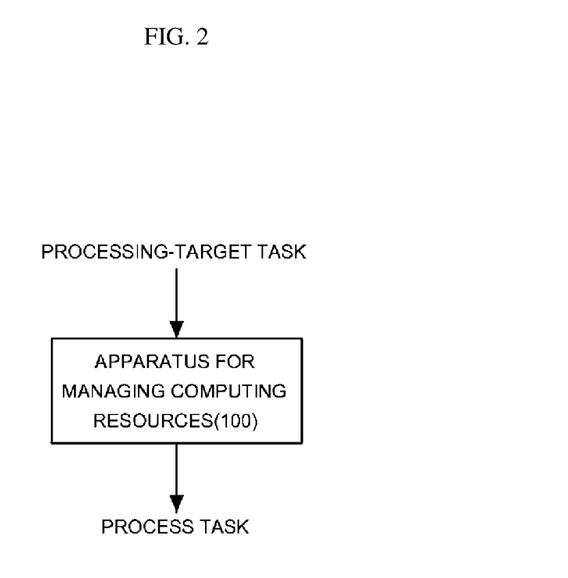
FIGS. 2 to 6 are example diagrams illustrating a process in which an apparatus for managing computing resources generates and deletes duplicate devices according to an exemplary embodiment of the present disclosure.

First, in FIG. 2, the task input interface 102 of the apparatus 100 for managing computing resources receives a plurality of processing-target tasks and sequentially inputs the received tasks into a task queue. Then, the task processor 104 sequentially extracts and processes the tasks input into the task queue.

Figure 3:
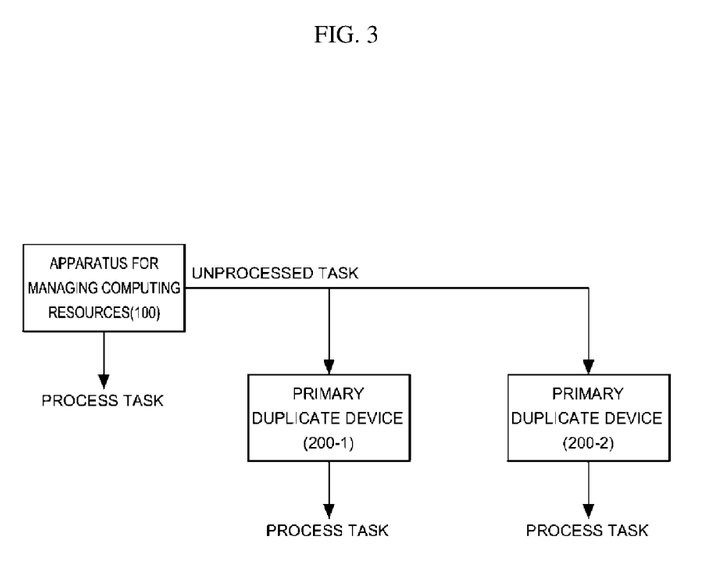

In FIG. 3, the duplicate device manager 106 determines that it is necessary to generate a duplicate device, generates two primary duplicate devices 200-1 and 200-2, and then equally assigns unprocessed tasks to the primary duplicate devices 200-1 and 200-2. As described above, the duplicate device manager 106 may wait for the unprocessed waiting time from a point in time when the task queue is filled to a certain level (e.g., 80% of the maximum queue or more) or higher, and then determine whether a duplicate device is necessary according to the calculated number or a calculated ratio of unprocessed tasks (tasks which have not been input into the task queue yet). Each of the primary duplicate devices 200-1 and 200-2 which are assigned the unprocessed tasks stores assigned tasks in a task queue therein and then sequentially processes the stored tasks in the same way as the apparatus 100 for managing computing resources.

Figure 4:
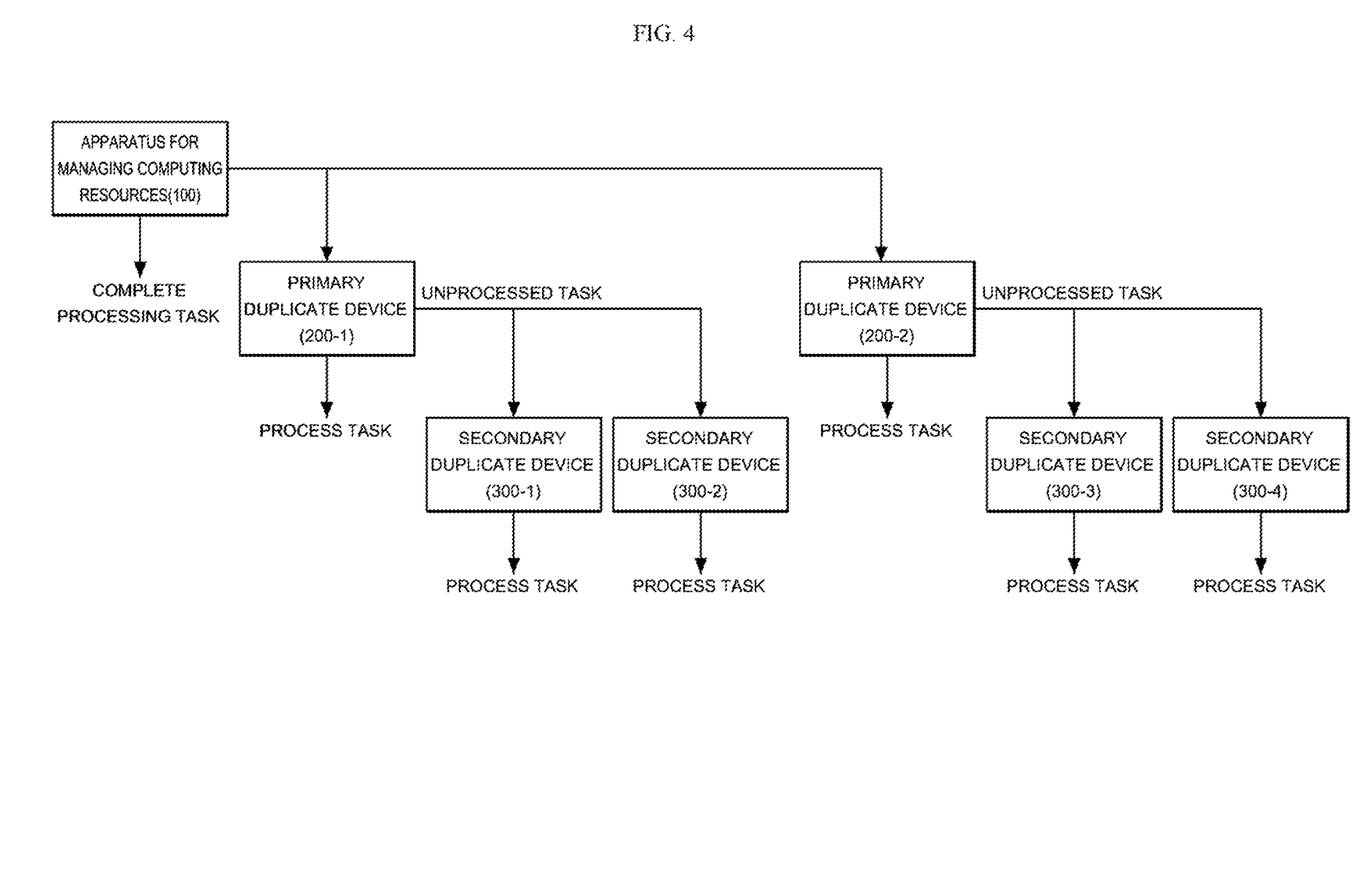

In FIG. 4, each of the primary duplicate devices 200-1 and 200-2 determines that it is necessary to generate a secondary duplicate device, generates two secondary duplicate devices 300-1 and 300-2 or 300-3 and 300-4, and then equally assigns unprocessed tasks therein to the generated secondary duplicate devices 300-1 and 300-2 or 300-3 and 300-4. In other words, like the apparatus 100 for managing computing resources, the primary duplicate devices 200-1 and 200-2 may respectively generate two secondary duplicate devices 300-1 and 300-2 and two secondary duplicate devices 300-3 and 300-4 according to the number or the ratio of unprocessed tasks. This is the same for the secondary duplicate devices 300-1, 300-2, 300-3, and 300-4 and subordinates thereof.

Figure 5:
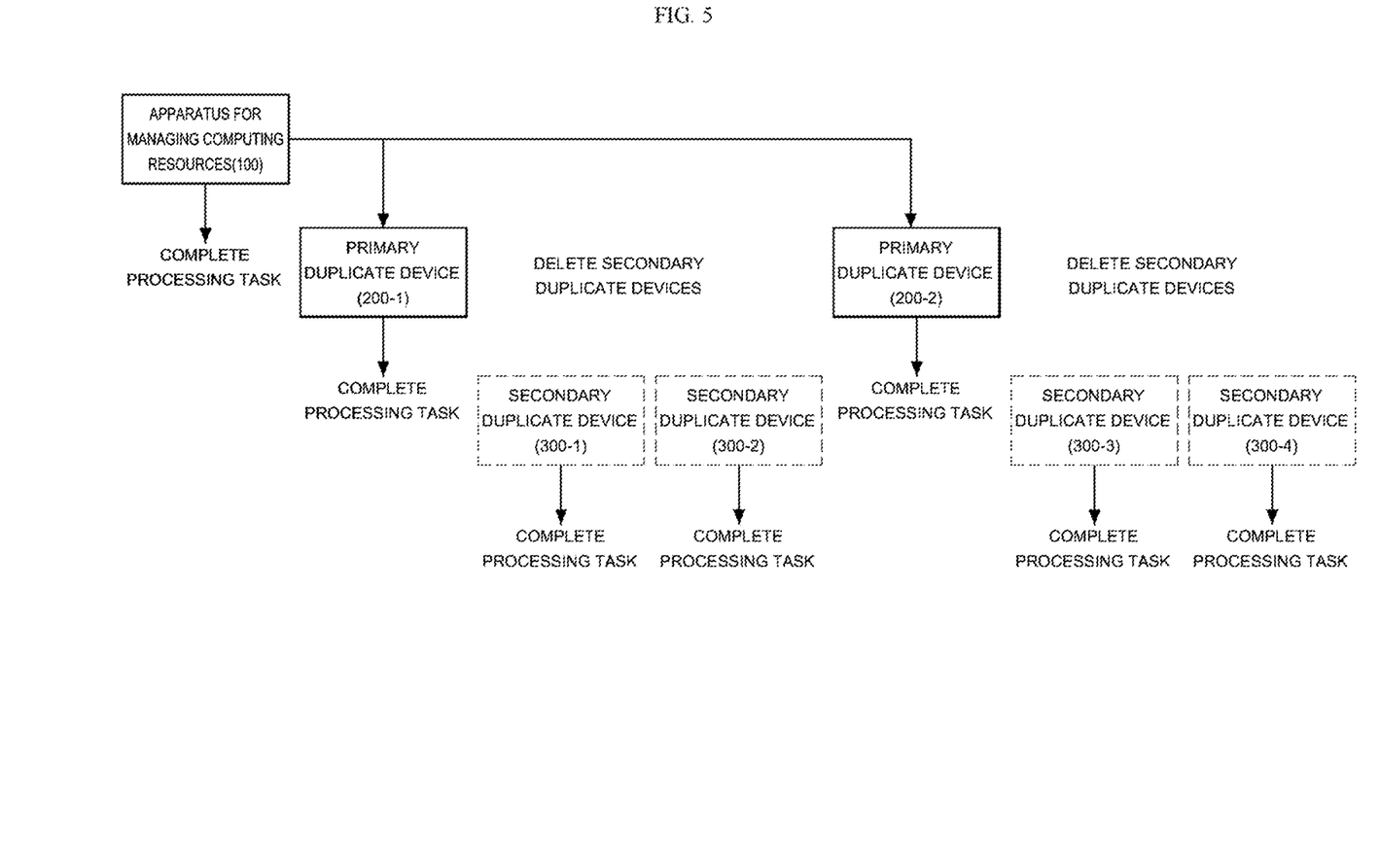

In FIG. 5, when a task of each of the primary duplicate devices 200-1 and 200-2 is completely processed, each of the primary duplicate devices 200-1 and 200-2 determines whether the secondary duplicate devices 300-1 and 300-2 or 300-3 and 300-4 generated by the primary duplicate device 200-1 or 200-2 have completely processed tasks. When the secondary duplicate devices 300-1 and 300-2 or 300-3 and 300-4 have completely processed tasks, the primary duplicate device 200-1 or 200-2 deletes the secondary duplicate devices 300-1 and 300-2 or 300-3 and 300-4.

Figure 6:
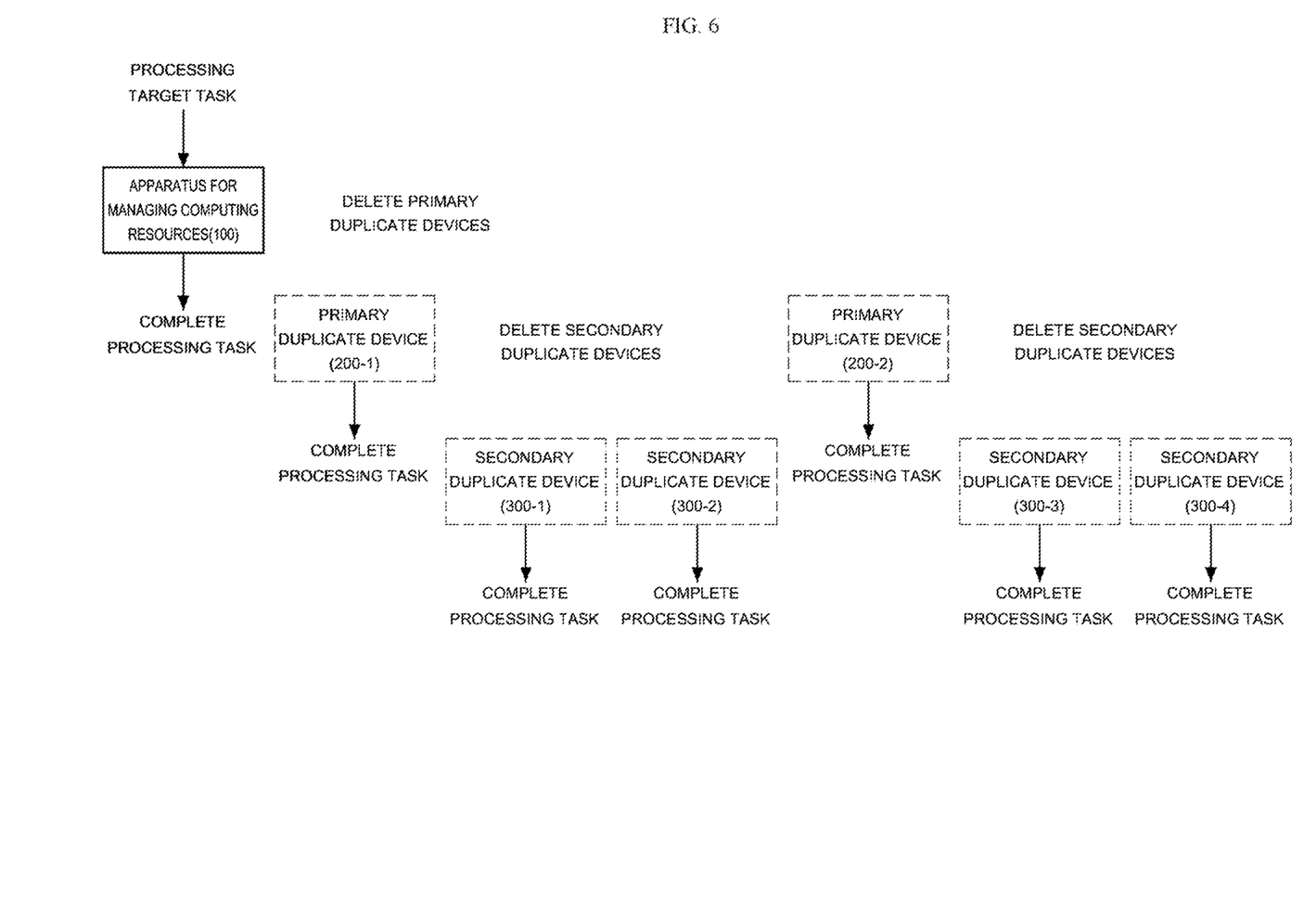

In FIG. 6, when a task of the apparatus 100 for managing computing resources is completely processed, the apparatus 100 for managing computing resources determines whether the primary duplicate devices 200-1 and 200-2 generated by the apparatus 100 for managing computing resources have completely processed tasks. When the primary duplicate devices 200-1 and 200-2 have completely processed tasks, the apparatus 100 for managing computing resources deletes the primary duplicate devices 200-1 and 200-2.

Figure 7:
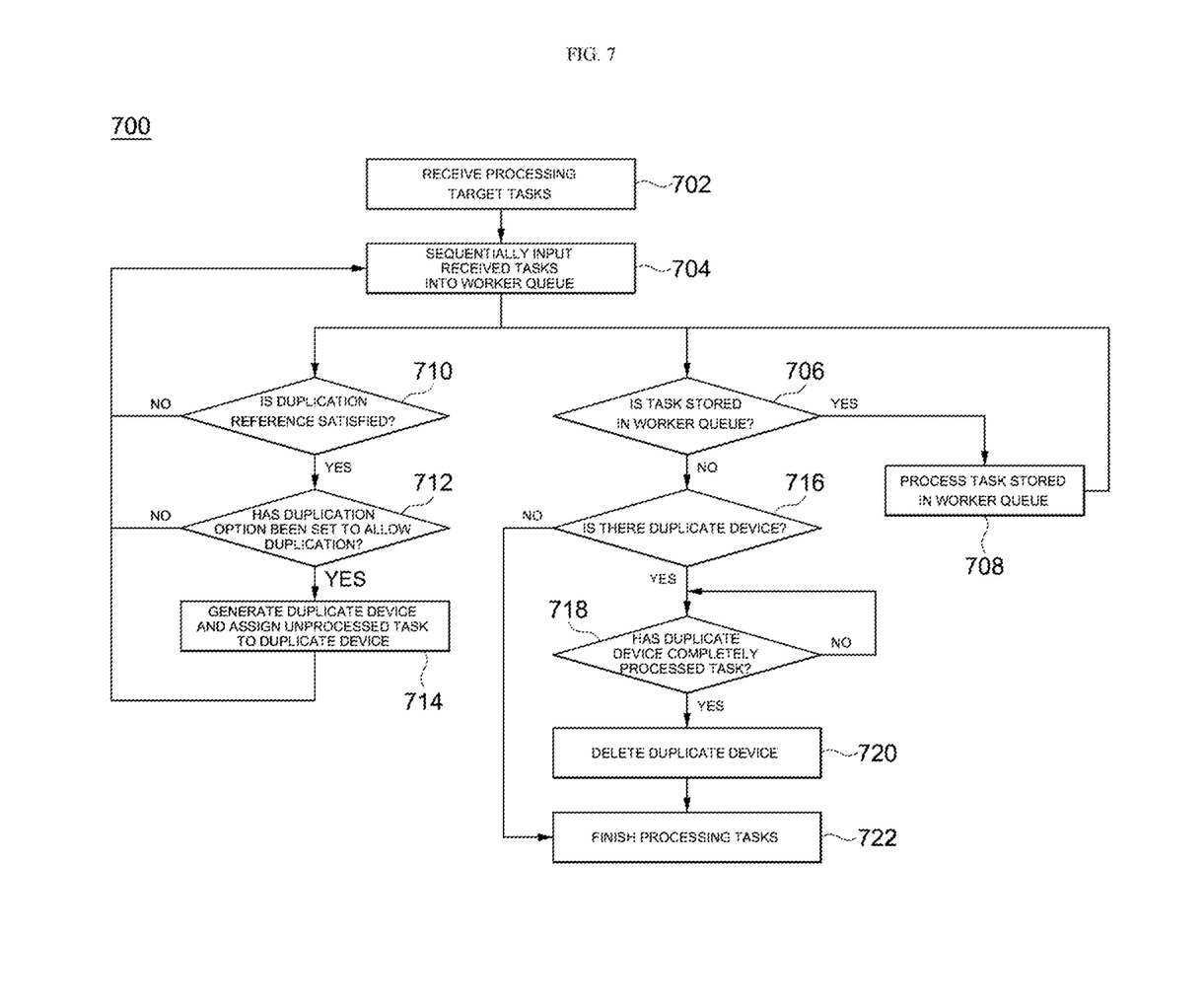
FIG. 7 is a flowchart illustrating a method of managing computing resources according to an exemplary embodiment of the present disclosure.

FIG. 7 is a flowchart illustrating a method 700 of managing computing resources according to an exemplary embodiment of the present disclosure. The method 700 illustrated in FIG. 7 may be performed by a computing device, for example, the above-described apparatus 100 for managing computing resources, which includes one or more processors and a memory storing one or more programs executed by the one or more processors. While the flowchart shows that the method 700 is divided into a plurality of operations, at least some operations may be performed in a different order, performed in combination with each other, omitted, or performed in sub-operations, or at least one operation not shown in the drawing may be added and performed.

In operation 702, the task input interface 102 of the apparatus 100 for managing computing resources receives a plurality of processing-target tasks.

In operation 704, the task input interface 102 sequentially inputs the received processing-target tasks into a task queue (worker queue).

In operation 706, the task processor 104 of the apparatus 100 for managing computing resources determines whether a task is stored in the task queue.

When it is determined that a task is stored in the task queue, the task processor 104 sequentially processes the processing-target tasks stored in the task queue in operation 708.

Meanwhile, in operation 710, the duplicate device manager 106 of the apparatus 100 for managing computing resources determines whether it is necessary to generate a duplicate device. As described above, the duplicate device manager 106 determines whether it is necessary to generate a duplicate device in consideration of one or more of a ratio of the number of unprocessed tasks to the number of processing target tasks and the number of unprocessed tasks which have not input into the task queue among the processing-target tasks.

When it is determined in operation 710 that it is necessary to generate a duplicate device (i.e., when a preset duplication criterion is satisfied), the duplicate device manager 106 checks a duplication option and determines whether the duplication option has been set to allow duplication in operation 712.

When it is determined in operation 712 that the duplication option has been set to allow duplication, that is, the duplication option has been set to "serial duplication," "parallel duplication," or the like, the duplicate device manager 106 generates one or more duplicate devices and assigns the unprocessed tasks to the generated duplicate devices in operation 714.

Conversely, when it is determined in operation 710 that it is not necessary to generate a duplicate device or it is determined in operation 712 that the duplication option has been set to "no duplication," the process returns to operation 704, and the duplicate device manager 106 resumes input of unprocessed tasks into the task queue.

On the other hand, when it is determined in operation 706 that no task is stored in the task queue (that is, when all the stored tasks have been completely performed), the duplicate device manager 106 determines whether there is a duplicate device generated by the duplicate device manager 106 in operation 716.

When it is determined in operation 716 that there is a duplicate device, the duplicate device manager 106 determines whether each duplicate device has completely processed a task in operation 718.

When it is determined in operation 718 that a duplicate device has not completely processed a task, the duplicate device manager 106 repeatedly performs operation 718 until the duplicate device completely processes the task. Conversely, when it is determined in operation 718 that each duplicate device has completely processed a task, the duplicate device manager 106 deletes the duplicate devices and finishes processing the tasks in operations 720 and 722. Even when it is determined in operation 716 that there is no duplicate device, the duplicate device manager 106 finishes processing the tasks (operation 722).

Figure 8:
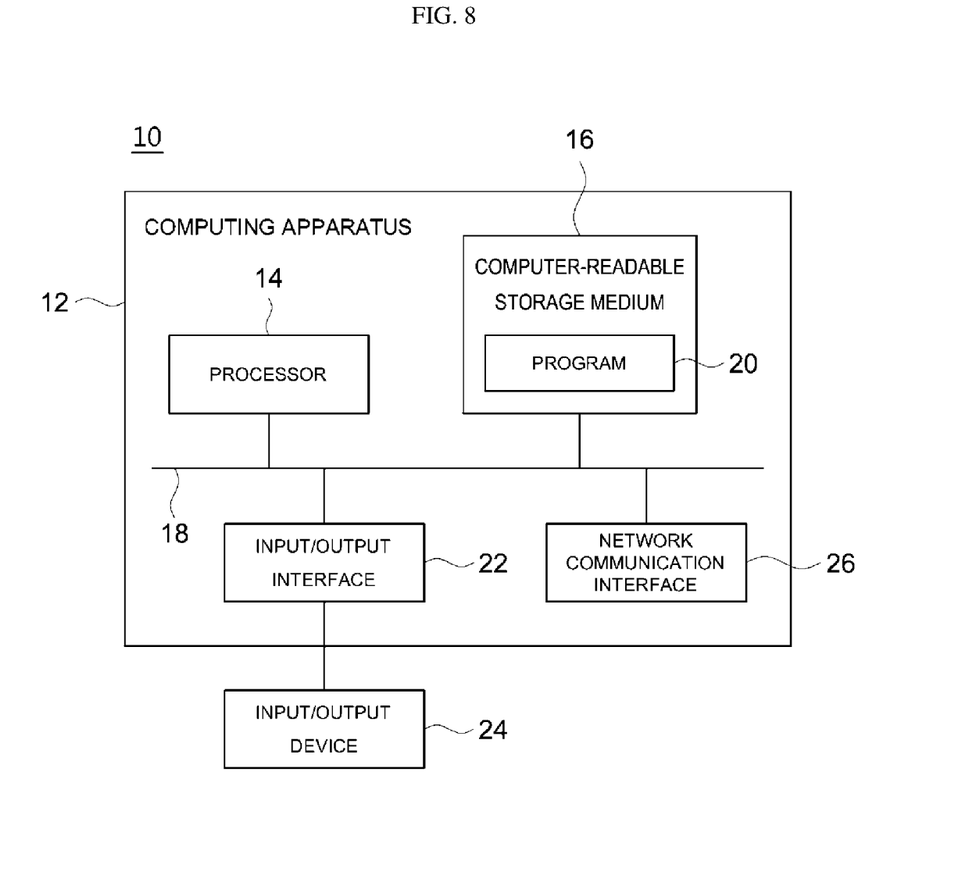
FIG. 8 is a block diagram illustrating a computing environment including a computing device appropriate for use in exemplary embodiments.

FIG. 8 is a block diagram illustrating a computing environment 10 including a computing device appropriate for use in the exemplary embodiments. In the exemplary embodiment shown in the drawing, each of components may have a function and a capability other than those described below, and an additional component other than components described below may be included.

The computing environment 10 shown in the drawing includes a computing device 12. In an exemplary embodiment, the computing device 12 may be the apparatus 100 for managing computing resources. The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause the computing device 12 to perform operations according to exemplary embodiments when executed by the processor 14.

The computer-readable storage medium 16 is configured to store computer-executable instructions or program code, program data, and/or information in other appropriate forms. A program 20 stored in the computer-readable storage medium 16 includes a set of instructions executable by the processor 14. In an exemplary embodiment, the computer-readable storage medium 16 may be a memory (a volatile memory such as a random access memory (RAM), a nonvolatile memory, or an appropriate combination thereof), one or more magnetic disk storage devices, optical disk storage devices, flash memory devices, another form of storage medium which is accessible by the computing device 12 and may store desired information, or an appropriate combination thereof.

The communication bus 18 connects various other components of the computing device 12 including the processor 14 and the computer-readable storage medium 16 to each other.

The computing device 12 may also include one or more input/output interfaces 22 for one or more input/output devices 24 and one or more network communication interfaces 26. The input/output interfaces 22 and the network communication interfaces 26 are connected to the communication bus 18. The input/output devices 24 may be connected to other components of the computing device 12 via the input/output interfaces 22. Examples of the input/output devices 24 may include input devices, such as a pointing device (a mouse, a trackpad, or the like), a voice or sound input device, various types of sensor devices, and/or a photographing device, and/or output devices, such as a display device, a printer, a speaker, and/or a network card. Examples of the input/output devices 24 may be included in the computing device 12 as components constituting the computing device 12, or may be connected to the computing device 12 as separate devices distinguished from the computing device 12.

Meanwhile, exemplary embodiments of the present disclosure may include a program for performing the methods described herein in a computer and a computer-readable recording medium including the program. The computer-readable recording medium may include program instructions, local data files, and local data structures solely or in combination. The medium may be specially designed and configured for the present disclosure or well-known and available to those of ordinary skill in the computer software field. Examples of the computer-readable recording medium include magnetic media, such as a hard disk, a floppy disk, and a magnetic tape, optical recording media, such as a compact disc read-only memory (CD-ROM) and a digital versatile disc (DVD), and hardware devices, such as a ROM, a RAM, a flash memory, and the like, specially configured to store and execute program instructions. Examples of the program instructions may include high-level language code executable by a computer using an interpreter or the like as well as machine language code generated by a compiler.

According to exemplary embodiments of the present disclosure, it is possible to assign optimal computing resources for the computation amount of processing-target tasks by dynamically generating one or more duplicate devices in stages according to the computation amount of processing-target tasks and distributing the processing-target tasks. Also, according to exemplary embodiments of the present disclosure, an administrator can manage only one device for managing computing resources without managing all virtual machines, so that the load of managing and administering computing resources required for processing a series of tasks can be minimized.

Although exemplary embodiments of the present disclosure have been described in detail above, those of ordinary skill in the art to which the present disclosure pertains will appreciate that various modifications may be made without departing from the scope of the present disclosure. Therefore, the scope of the present disclosure is to be determined by the following claims and their equivalents, and is not restricted or limited by the foregoing detailed description.

What is claimed is:

1. An apparatus for managing computing resources, the apparatus comprising:
   a memory storing one or more instructions; and
   one or more processors configured to execute the one or more instructions to:

receive a plurality of processing-target tasks that need to be processed;

process the plurality of received processing-target tasks; and generate one or more duplicate devices based on at least one among a ratio of a number of unprocessed tasks to a number of processing-target tasks and the number of unprocessed tasks; and assign unprocessed tasks to the one or more generated duplicate devices, wherein each of the one or more duplicate devices is a replica of the apparatus for managing computing resources, and wherein the one or more processors are further configured to:

determine whether it is necessary to generate the one or more duplicate devices based on at least one among the number of unprocessed tasks and the ratio of the number of unprocessed tasks to the number of processing-target tasks; and determine a number of duplicate devices to be generated based on at least one among the number of unprocessed tasks and the ratio of the number of unprocessed tasks to the number of processing-target tasks at time when it is determined to generate the one or more duplicate devices.

2. The apparatus of claim 1, wherein the one or more processors are further configured to generate the one or more duplicate devices in response to the ratio of the number of unprocessed tasks to the number of processing-target tasks is equal to or greater than a preset value.

3. The apparatus of claim 2, wherein the one or more processors are further configured to input the plurality of received processing-target tasks to a task queue, wherein the one or more processors are further configured to process processing-target tasks stored in the task queue, and wherein the one or more processors are further configured to calculate the ratio of the number of unprocessed tasks to the number of processing-target tasks in response to a usage rate of the task queue being within or exceeding a preset range.

4. The apparatus of claim 2, wherein the one or more processors are further configured to equally assign the unprocessed tasks to two or more duplicate devices in response to the two or more duplicate devices being generated.

5. The apparatus of claim 1, wherein the one or more duplicate devices are configured to process one or more tasks assigned by the apparatus for managing computing resources, generate one or more secondary duplicate devices corresponding to the one or more duplicate devices based on at least one among a ratio of a number of unprocessed secondary tasks to a number of assigned unprocessed tasks and the number of unprocessed secondary tasks, and assign unprocessed secondary tasks to the one or more secondary duplicate devices.

6. The apparatus of claim 1, wherein the one or more processors are further configured to determine whether the unprocessed tasks assigned to the one or more duplicate devices have been completed and delete the one or more duplicate devices in response to determining the unprocessed tasks have been completed.

7. The apparatus of claim 1, wherein the unprocessed tasks are from among the processing-target tasks.

8. A method of managing computing resources, the method being performed by a computing device including one or more processors and a memory storing one or more programs executed by the one or more processors and comprising:

receiving a plurality of processing-target tasks that need to be processed;

processing the plurality of received processing-target tasks;

generating one or more duplicate devices based on at least one among a ratio of a number of unprocessed tasks to a number of processing-target tasks and the number of unprocessed tasks; and assigning unprocessed tasks to the one or more generated duplicate devices, wherein each of the one or more duplicate devices is a replica of the computing device, and wherein the generating of the one or more duplicate devices comprises:

determining whether it is necessary to generate the one or more duplicate devices based on at least one among the number of unprocessed tasks and the ratio of the number of unprocessed tasks to the number of processing-target tasks; and determining a number of duplicate devices to be generated based on at least one among the number of unprocessed tasks and the ratio of the number of unprocessed tasks to the number of processing-target tasks at time when it is determined to generate the one or more duplicate devices.

9. The method of claim 8, wherein the generating of the one or more duplicate devices comprises generating the one or more duplicate devices in response to the ratio of the number of unprocessed tasks to the number of processing-target tasks is equal to or greater than a preset value.

10. The method of claim 9, wherein the receiving of the plurality of processing-target tasks comprises inputting the plurality of received processing-target tasks to a task queue, wherein the processing of the plurality of received processing-target tasks comprises processing the plurality of processing-target tasks, and wherein the generating of the one or more duplicate devices comprises calculating the ratio of the number of unprocessed tasks to the number of processing-target tasks in response to a usage rate of the task queue being within or exceeding a preset range.

11. The method of claim 9, wherein the assigning of the unprocessed tasks comprises equally assigning the unprocessed tasks to two or more duplicate devices in response to the two or more duplicate devices being generated.

12. The method of claim 8, further comprising, by the one or more duplicate devices, processing one or more tasks assigned by the computing device, generating one or more secondary duplicate devices corresponding to the one or more duplicate devices based on at least one among one or more of a ratio of a number of unprocessed secondary tasks to a number of assigned unprocessed tasks and the number of unprocessed secondary tasks, and assigning unprocessed secondary tasks to the one or more secondary duplicate devices.

13. The method of claim 8, further comprising, after the assigning of the unprocessed tasks:

determining whether the unprocessed tasks assigned to the one or more duplicate devices have been completed; and deleting the one or more duplicate devices in response to determining the unprocessed tasks have been completed.

14. A non-transitory computer readable recording medium having embodied thereon a program, which when executed by a processor causes the processor to execute a method including:
- receiving a plurality of processing-target tasks that need to be processed;
- processing the plurality of received processing-target tasks;
- generating one or more duplicate devices based on at least one among a ratio of a number of unprocessed tasks to a number of processing-target tasks and the number of unprocessed tasks; and
- assigning unprocessed tasks to the one or more generated duplicate devices,
- wherein each of the one or more duplicate devices is a replica of a computing device, and
- wherein the generating of the one or more duplicate devices includes:
  - determining whether it is necessary to generate the one or more duplicate devices based on at least one among the number of unprocessed tasks and the ratio of the number of unprocessed tasks to the number of processing-target tasks; and
  - determining a number of duplicate devices to be generated based on at least one among the number of unprocessed tasks and the ratio of the number of unprocessed tasks to the number of processing-target tasks at time when it is determined to generate the one or more duplicate devices.

15. The non-transitory computer readable recording medium of claim 14, wherein the generating of the one or more duplicate devices includes generating the one or more duplicate devices in response to the ratio of the number of unprocessed tasks to the number of processing-target tasks is equal to or greater than a preset value.

16. The non-transitory computer readable recording medium of claim 15, wherein the receiving of the plurality of processing-target tasks includes inputting the plurality of received processing-target tasks to a task queue,
- wherein the processing of the plurality of received processing-target tasks includes processing the plurality of processing-target tasks, and
- wherein the generating of the one or more duplicate devices includes calculating the ratio of the number of unprocessed tasks to the number of processing-target tasks in response to a usage rate of the task queue being within or exceeding a preset range.

17. The non-transitory computer readable recording medium of claim 15, wherein the assigning of the unprocessed tasks includes equally assigning the unprocessed tasks to two or more duplicate devices in response to the two or more duplicate devices being generated.

* * * * *